(12) United States Patent
Hasunuma

(10) Patent No.: US 10,767,802 B2
(45) Date of Patent: Sep. 8, 2020

(54) FLUID APPARATUS

(71) Applicant: Surpass Industry Co., Ltd., Saitama (JP)

(72) Inventor: Masahiro Hasunuma, Saitama (JP)

(73) Assignee: Surpass Industry Co., Ltd., Gyoda-shi, Saitama (JP)

( * ) Notice: Subject to any disclaimer, the term of this patent is extended or adjusted under 35 U.S.C. 154(b) by 0 days.

(21) Appl. No.: 15/909,019

(22) Filed: Mar. 1, 2018

(65) Prior Publication Data

US 2018/0252352 A1    Sep. 6, 2018

(30) Foreign Application Priority Data

Mar. 3, 2017  (JP) ................... 2017-040396

(51) Int. Cl.

| | |
|---|---|
| *F16L 55/07* | (2006.01) |
| *F16L 37/34* | (2006.01) |
| *F16K 1/32* | (2006.01) |
| *F16L 37/32* | (2006.01) |
| *H05F 3/02* | (2006.01) |

(52) U.S. Cl.
CPC ............... *F16L 55/07* (2013.01); *F16K 1/32* (2013.01); *F16L 37/32* (2013.01); *F16L 37/34* (2013.01); *H05F 3/02* (2013.01)

(58) Field of Classification Search
CPC . F16L 55/07; F16L 37/32; F16L 37/34; F16L 37/35; F16K 1/32; H05F 3/02
See application file for complete search history.

(56) References Cited

U.S. PATENT DOCUMENTS 4,733,692 A * 3/1988 Kotake ................... F16L 37/23
                                                         137/614.03
6,371,443 B1 * 4/2002 Imai ...................... F16L 37/23
                                                         137/614.04
(Continued)

FOREIGN PATENT DOCUMENTS

| DE | 102014112584 A1 | 5/2015 |
| JP | 2003-004176 A | 1/2003 |
| JP | 5987100 B1 | 9/2016 |

OTHER PUBLICATIONS

European Search Report dated Jun. 14, 2018 in corresponding application 18158765.0.

*Primary Examiner* — Craig J Price
*Assistant Examiner* — Andrew J Rost
(74) *Attorney, Agent, or Firm* — Muncy, Geissler, Olds & Lowe, P.C.

(57) ABSTRACT

Provided is a plug device which includes: a body portion; and a valve element portion. A fluid flow passage is formed in the body portion. The fluid flow passage extends along an axis, and has a valve hole at one end thereof. The valve element portion is accommodated in the body portion in an advancing and retracting manner along the axis. A proximal end portion of the valve element portion is made of a conductive fluororesin material containing a fluororesin material and carbon nanotubes dispersed in the fluororesin material. The proximal end portion is conductive with a conductive member maintained at a ground potential. A volume resistivity of the conductive fluororesin material falls within a range of larger than $1.0 \times \times 10^3$ Ω·cm and less than $1.0 \times 10^4$ Ω·cm.

6 Claims, 4 Drawing Sheets

(56) References Cited

U.S. PATENT DOCUMENTS

| | | | |
|---|---|---|---|
| 6,800,812 B1 * | 10/2004 | Franks, Jr. | H01R 4/643 174/135 |
| 7,565,065 B2 * | 7/2009 | Kato | F24H 1/102 392/311 |
| 8,469,406 B2 * | 6/2013 | Takahashi | F16L 37/23 137/614.05 |
| 9,638,345 B2 | 5/2017 | Okita et al. | |
| 9,995,415 B2 | 6/2018 | Imai et al. | |
| 2003/0021929 A1 | 1/2003 | Takahashi et al. | |
| 2015/0123394 A1 * | 5/2015 | Breay | B64D 37/32 285/48 |

* cited by examiner

FLUID APPARATUS

CROSS-REFERENCE TO RELATED APPLICATIONS

This application is based on Japanese Patent Application No. 2017-040396, the contents of which are incorporated herein by reference in its entirety.

Technical Field

The present disclosure relates to a fluid apparatus where a valve element portion is made of a conductive resin material.

Background Art

A fluororesin material is excellent in chemical resistance and stain resistance. Accordingly, the fluororesin material is widely used in fluid apparatuses for allowing fluids used in manufacturing semiconductors, such as a corrosive fluid and pure water, to flow therethrough.

The fluororesin material has a volume resistivity of larger than $10^{18}$ Ω·cm thus being classified into an insulating material in general. Accordingly, charging may occur in a fluid apparatus which uses the fluororesin material due to friction between a fluid flow passage formed in the fluid apparatus and a fluid.

To cope with the above-mentioned problem, there has been known an antistatic fluororesin tube where a conductive portion made of a fluororesin composition containing a conductive substance is embedded on an outer peripheral surface of the fluororesin tube in a stripe shape thus imparting conductivity to the fluororesin tube (see Japanese Unexamined Patent Application, Publication No. 2003-4176 (hereinafter referred to as Patent Literature 1), for example).

SUMMARY

Technical Problem

However, in the antistatic fluororesin tube disclosed in Patent Literature 1, conductivity is not imparted to an inner peripheral surface of a fluid flow passage where charging easily occurs due to friction with a fluid. Accordingly, charges generated on the inner peripheral surface of the fluid flow passage cannot be removed reliably so that breakdown of a resin material forming the fluid flow passage may occur due to excessive charging of static electricity.

Particularly, in the fluid flow passage having a valve hole at one end thereof, there is a problem of static electricity being easily generated because a flow speed of a fluid increases at a gap formed between the valve hole and the valve element portion.

The present disclosure has been made in view of such circumstances, and it is an object of the present disclosure to provide a fluid apparatus where a problem can be prevented which is caused by static electricity generated at a gap formed between a valve hole and a valve element portion.

Solution to Problem

To solve the above-mentioned problem, the present disclosure adopts the following means.

A fluid apparatus according to one aspect of the present disclosure includes: a body portion in which a fluid flow passage is formed, the fluid flow passage extending along an axis, and having a valve hole at one end of the fluid flow passage; and a valve element portion accommodated in the body portion in an advancing and retracting manner along the axis. At least a portion of the valve element portion is made of a conductive fluororesin material containing a fluororesin material and carbon nanotubes dispersed in the fluororesin material, and is conductive with a grounding portion maintained at a ground potential. A volume resistivity of the conductive fluororesin material falls within a range of larger than $1.0 \times 10^3$ Ω·cm and less than $1.0 \times 10^4$ Ω·cm.

With the fluid apparatus according to one aspect of the present disclosure, a fluid flowing into the fluid flow passage increases a flow speed at the gap formed between the valve hole and the valve element portion thus being charged with static electricity generated due to friction with the valve hole and the valve element portion. The fluid charged with static electricity flows through the fluid flow passage while being in contact with the valve element portion accommodated in the body portion. At least a portion of the valve element portion is made of a conductive fluororesin material having a volume resistivity sufficient for allowing static electricity to be conducted and the valve element portion is conductive with the grounding portion maintained at a ground potential. With such a configuration, static electricity charged on a fluid flowing through the fluid flow passage is removed by the grounding portion through at least a portion of the valve element portion made of a conductive fluororesin material.

As described above, with the fluid apparatus according to one aspect of the present disclosure, it is possible to provide the fluid apparatus where a problem can be prevented such as breakdown caused by static electricity generated at the gap formed between the valve hole and the valve element portion.

In the fluid apparatus according to one aspect of the present disclosure, the conductive fluororesin material may contain carbon nanotubes at a ratio of 0.020 weight % or more and 0.030 weight % or less.

Even if a ratio of carbon nanotubes is extremely small as described above, carbon nanotubes of 0.020 weight % or more are dispersed in the fluororesin material so that fixed conductivity is imparted to the valve element portion whereby static electricity can be properly removed. Further, a ratio of carbon nanotubes contained in the conductive fluororesin material is extremely small, that is, 0.030 weight % or less. Accordingly, different from other conductive substances in the form of grain such as carbon black or iron powder, it is possible to prevent contamination of a fluid caused by a contact between the valve element portion and the fluid.

In the fluid apparatus according to one aspect of the present disclosure, the valve element portion may be formed into a tubular shape conforming to an inner peripheral surface of the body portion, and the valve element portion may have an inner space in communication with the other end of the fluid flow passage, and a flow hole allowing a fluid to flow between the inner space and the valve hole.

With the fluid apparatus having the above-mentioned configuration, a fluid flowing into the fluid flow passage from the valve hole is charged with static electricity due to friction both when the fluid passes through the gap formed between the valve hole and the valve element portion and when the fluid passes through the flow hole. The fluid charged with static electricity is introduced into the inner space of the valve element portion. Static electricity charged on the fluid flowing through the inner space is removed by the grounding portion through the valve element portion formed into a tubular shape.

In the fluid apparatus having the above-mentioned configuration, the fluid apparatus may further include: a biasing force generating portion configured to generate a biasing force in a direction that the valve element portion is inserted into the valve hole. The valve element portion may include: a distal end portion inserted into the valve hole by the biasing force of the biasing force generating portion; and a proximal end portion having the flow hole and the inner space. The proximal end portion may be made of the conductive fluororesin material. The distal end portion may be made of a non-conductive fluororesin material containing no carbon nanotubes.

With the fluid apparatus having the above-mentioned aspect, the distal end portion is inserted into the valve hole by a biasing force of the biasing force generating portion, and the distal end portion is made of a non-conductive fluororesin material containing no carbon nanotubes. Accordingly, the distal end portion can ensure sufficient strength and, at the same time, it is possible to prevent carbon nanotubes being mixed into a fluid due to a contact between the distal end portion and the valve seat.

In the fluid apparatus according to one aspect of the present disclosure, at least a portion of the body portion may be made of the conductive fluororesin material. At least the portion of the body portion may be in contact with both a portion of the valve element portion which is made of the conductive fluororesin material and the grounding portion.

With the fluid apparatus having the above-mentioned configuration, a portion of the valve element portion made of a conductive fluororesin material and the grounding portion are made conductive through at least a portion of the body portion. Accordingly, it is possible to properly remove static electricity charged on a fluid which comes into contact with the valve element portion.

In the fluid apparatus having the above-mentioned configuration, the body portion may include: a first body portion configured to support an outer peripheral surface of the valve element portion on a distal end side; and a second body portion configured to support an outer peripheral surface of the valve element portion on a proximal end side, the second body portion being disposed on an inner peripheral side of the first body portion. The first body portion may be made of a non-conductive fluororesin material containing no carbon nanotubes. The second body portion may be made of the conductive fluororesin material, and may be in contact with both a portion of the valve element portion which is made of the conductive fluororesin material and the grounding portion.

With the above-mentioned fluid apparatus, the first body portion is made of a non-conductive fluororesin material containing no carbon nanotubes. The second body portion made of a conductive fluororesin material is disposed on the inner peripheral side of the first body portion. Accordingly, a non-conductive fluororesin material having relatively high strength is disposed on the outer side and hence, it is possible to provide a fluid apparatus having sufficient strength against an impact or the like from the outside. Further, a portion of a casing of the fluid apparatus is made of a non-conductive fluororesin material. With such a configuration, a manufacturing cost of the fluid apparatus can be reduced compared to a case where the entire casing of the fluid apparatus is made of a conductive fluororesin material.

Advantageous Effects

According to the present disclosure, it is possible to provide a fluid apparatus where a problem can be prevented which is caused by static electricity generated at a gap formed between a valve hole and a valve element portion.

DESCRIPTION OF EMBODIMENTS

Hereinafter, a coupling device 300 which is one embodiment of a fluid apparatus according to the present disclosure is described with reference to drawings. The coupling device 300 of this embodiment is a fluid apparatus for coupling pipes to each other, and a fluid (liquid such as a chemical solution or pure water), which is used in a semiconductor manufacturing apparatus or the like, is allowed to flow through the pipes.

Figure 1:
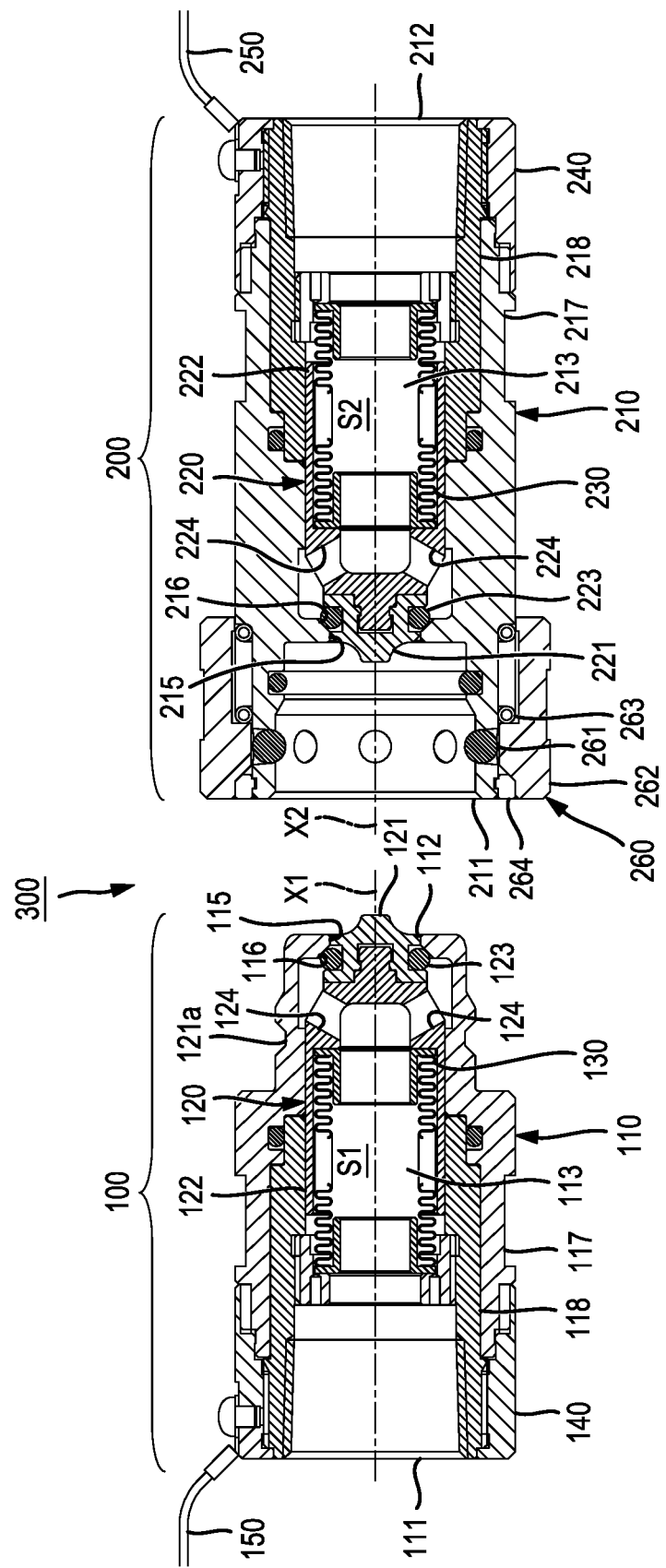
FIG. 1 is a longitudinal cross-sectional view showing one embodiment of a coupling device in a state where a plug device and a socket device are separated from each other.
Figure 2:
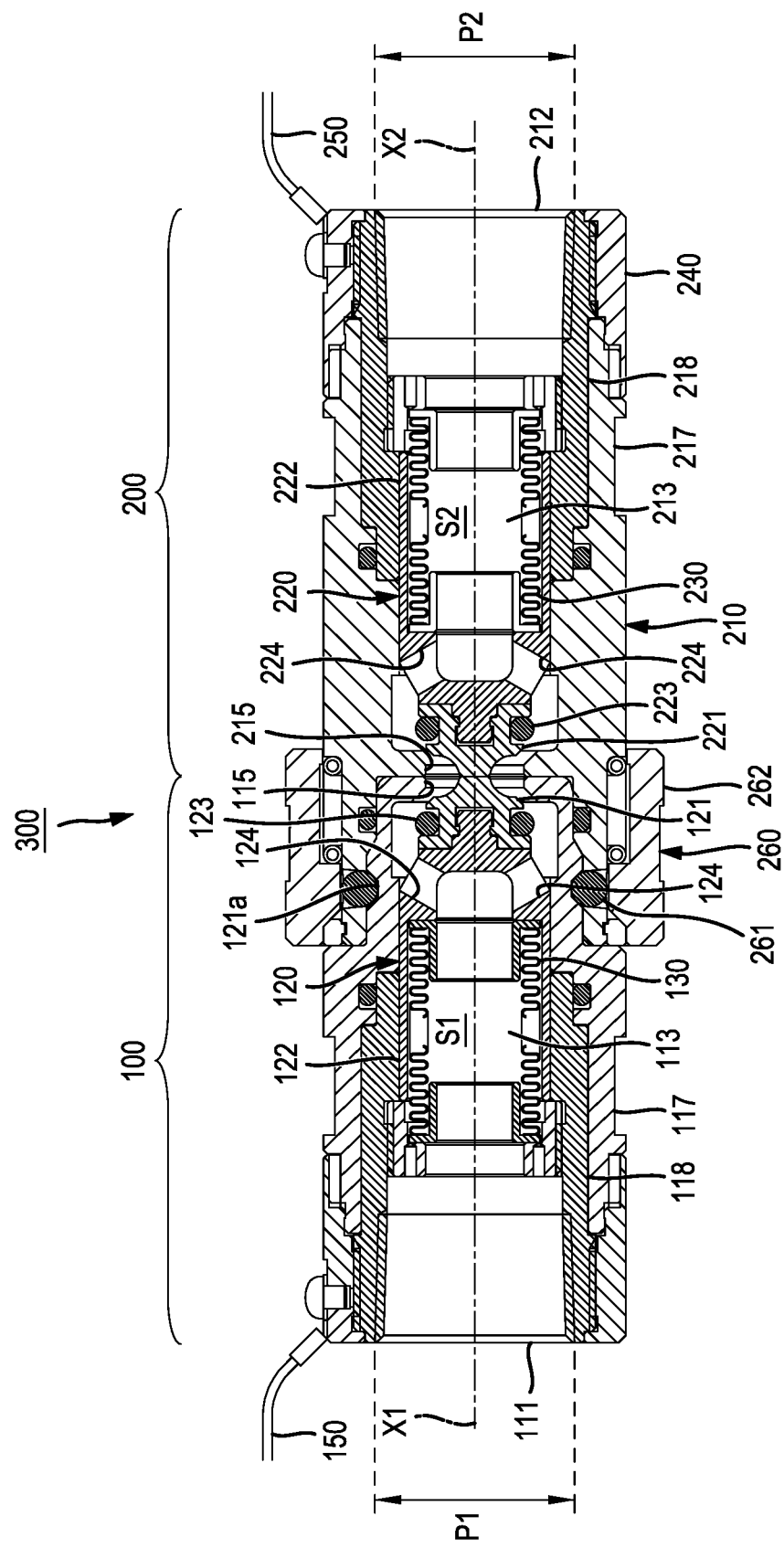
FIG. 2 is a longitudinal cross-sectional view showing one embodiment of the coupling device in a state where the plug device and the socket device are coupled to each other.

As shown in FIG. 1 and FIG. 2, the coupling device 300 includes a plug device (fluid apparatus) 100 and a socket device (fluid apparatus) 200. The coupling device 300 is a device where the plug device 100 and the socket device 200 are coupled to each other so as to allow a fluid to flow between the pipe P1, which is connected to a flow port 111 of the plug device 100, and the pipe P2, which is connected to a flow port 212 of the socket device 200. The coupling device 300 is a device where a fluid is allowed to flow from the flow port 111 toward the flow port 212, and a fluid is also allowed to flow from the flow port 211 toward the flow port 111.

The plug device 100 is described.

As shown in FIG. 1 and FIG. 2, the plug device 100 includes: a body portion 110; a valve element portion 120 accommodated in the body portion 110, and inserted into a valve hole 115; a spring (biasing force generating portion) 130 for generating a biasing force in the direction that the valve element portion 120 is brought into contact with the valve hole 115; and a conductive member (grounding portion) 140.

The body portion 110 is a member in which a fluid flow passage 113 is formed, and the fluid flow passage 113 allows a fluid to flow between the flow port 111 and a flow port 112. The fluid flow passage 113 is a flow passage extending along an axis X1, and has the valve hole 115 at one end thereof on the flow port 112 side. A valve seat 116 is formed in the vicinity of the valve hole 115 of the body portion 110. When the valve element portion 120 is inserted into the valve hole 115, the valve seat 116 is brought into contact with an O-ring 123 mounted on a distal end portion 121 of the valve element portion 120 thus forming an annular sealing region about the axis X1.

The body portion 110 includes: a first body portion 117 and a second body portion 118. The first body portion 117 has a cylindrical inner peripheral surface which supports an outer peripheral surface of a portion of the valve element portion 120 on the distal end side (flow port 112 side). The second body portion 118 has a cylindrical inner peripheral surface which supports an outer peripheral surface of a portion of the valve element portion 120 on the proximal end side (flow port 111 side). As shown in FIG. 1 and FIG. 2, the second body portion 118 is disposed on the inner peripheral side of the first body portion 117 so as to come into contact with the inner peripheral surface of the first body portion 117.

The valve element portion 120 is a member accommodated in the body portion 110 in an advancing and retracting manner along the axis X1. The valve element portion 120 is a member which is formed into a cylindrical shape conforming to an inner peripheral surface of the body portion 110, and is inserted into the valve hole 115 which allows a fluid, flowing between the plug device 100 and the socket device 200, to flow therethrough. As shown in FIG. 1 and FIG. 2, the valve element portion 120 has an inner space S1 of the fluid flow passage 113 and a plurality of flow holes 124. The inner space S1 communicates with the flow port 111. The plurality of flow holes 124 allow a fluid to flow between the inner space S1 and the valve hole 115. The plurality of flow holes 124 are formed at equal intervals (intervals of 60°, for example) about the axis X1.

The valve element portion 120 includes a distal end portion 121 and a proximal end portion 122. The distal end portion 121 is inserted into the valve hole 115 by a biasing force of the spring 130. The proximal end portion 122 has the flow holes 124 and the inner space S1. The distal end portion 121 is fixed to the proximal end portion 122 so as not to move in the direction of the axis X1. That is, the distal end portion 121 is integrally formed with the proximal end portion 122 so that the distal end portion 121 moves in the direction of the axis X1 together with the proximal end portion 122. An engaging groove 121a having an annular shape about the axis X1 is formed on an outer peripheral surface of the distal end portion 121. Lock balls 261 of a coupling mechanism 260 of the socket device 200 engage with the engaging groove 121a.

The spring 130 is a member which has a tubular inner portion forming a portion of the fluid flow passage 113. The spring 130 is made of a resin (for example, PFA), and generates a biasing force in the direction that the valve element portion 120 is inserted into the valve hole 115 along the axis X1. As shown in FIG. 1, in a state where the plug device 100 is separated from the socket device 200, the plug device 100 is brought into a cut-off state where the O-ring 123 mounted on the distal end portion 121 of the valve element portion 120 is in contact with the valve seat 116 of the body portion 110 by a biasing force of the spring 130.

The conductive member 140 is a metal member (made of stainless steel, for example) mounted on an end portion of the body portion 110 on the flow port 111 side in a state of being in contact with the second body portion 118. The conductive member 140 is connected to a ground cable 150 maintained at a ground potential. Accordingly, the conductive member 140 is maintained at a ground potential by the ground cable 150.

Next, the socket device 200 is described.

As shown in FIG. 1 and FIG. 2, the socket device 200 includes: a body portion 210; a valve element portion 220 accommodated in the body portion 210, and inserted into a valve hole 215; a spring (biasing force generating portion) 230 for generating a biasing force in the direction that the valve element portion 220 is brought into contact with the valve hole 215; a conductive member (grounding portion) 240; and the coupling mechanism 260 for coupling the socket device 200 to the plug device 100.

The body portion 210 is a member in which a fluid flow passage 213 is formed, and the fluid flow passage 213 allows a fluid to flow between the flow port 211 and the flow port 212. The fluid flow passage 213 is a flow passage extending along an axis X2, and has the valve hole 215 at one end thereof on the flow port 211 side. A valve seat 216 is formed in the vicinity of the valve hole 215 of the body portion 210. When the valve element portion 220 is inserted into the valve hole 215, the valve seat 216 is brought into contact with an O-ring 223 mounted on a distal end portion 221 of the valve element portion 220 thus forming an annular sealing region about the axis X2.

The body portion 210 includes: a first body portion 217 and a second body portion 218. The first body portion 217 has a cylindrical inner peripheral surface which supports an outer peripheral surface of a portion of the valve element portion 220 on the distal end side (flow port 211 side). The second body portion 218 has a cylindrical inner peripheral surface which supports an outer peripheral surface of a portion of the valve element portion 220 on the proximal end side (flow port 212 side). As shown in FIG. 1 and FIG. 2, the second body portion 218 is disposed on the inner peripheral side of the first body portion 217 so as to come into contact with the inner peripheral surface of the first body portion 217.

The valve element portion 220 is a member accommodated in the body portion 210 in an advancing and retracting manner along the axis X2. The valve element portion 220 is a member which is formed into a cylindrical shape conforming to an inner peripheral surface of the body portion 210, and is inserted into the valve hole 215 which allows a fluid, flowing between the plug device 100 and the socket device 200, to flow therethrough. As shown in FIG. 1 and FIG. 2, the valve element portion 220 has an inner space S2 of the fluid flow passage 213 and a plurality of flow holes 224. The inner space S2 communicates with the flow port 212. The plurality of flow holes 224 allow a fluid to flow between the inner space S2 and the valve hole 215. The plurality of flow holes 224 are formed at equal intervals (intervals of 60°, for example) about the axis X2.

The valve element portion 220 includes a distal end portion 221 and a proximal end portion 222. The distal end portion 221 is inserted into the valve hole 215 by a biasing force of the spring 230. The proximal end portion 222 has the flow holes 224 and the inner space S2. The distal end portion 221 is fixed to the proximal end portion 222 so as not to move in the direction of the axis X2. That is, the distal end portion 221 is integrally formed with the proximal end portion 222 so that the distal end portion 221 moves in the direction of the axis X2 together with the proximal end portion 222. The coupling mechanism 260, which is engaged with the engaging groove 121a of the plug device 100, is formed on an outer peripheral surface of the distal end portion 221.

The spring 230 is a member which has a tubular inner portion forming a portion of the fluid flow passage 213. The spring 230 is made of a resin (for example, PFA), and generates a biasing force in the direction that the valve element portion 220 is inserted into the valve hole 215 along the axis X2. As shown in FIG. 1, in a state where the socket device 200 is separated from the plug device 100, the socket device 200 is brought into a cut-off state where the O-ring 223 mounted on the distal end portion 221 of the valve element portion 220 is in contact with the valve seat 216 of the body portion 210 by a biasing force of the spring 230.

The conductive member 240 is a metal member (made of stainless steel, for example) mounted on an end portion of the body portion 210 on the flow port 212 side in a state of being in contact with the second body portion 218. The conductive member 240 is connected to a ground cable 250 maintained at a ground potential. Accordingly, the conductive member 240 is maintained at a ground potential by the ground cable 250.

The coupling mechanism 260 is a mechanism for coupling the socket device 200 to the plug device 100. The coupling mechanism 260 includes: the plurality of lock balls 261; a tubular member 262 disposed along an outer peripheral surface of the first body portion 217; a spring 263 for applying a biasing force along the axis X2 to the tubular member 262; and a restricting member 264 mounted on the outer peripheral surface of the first body portion 217 so as to restrict the movement of the tubular member 262.

As shown in FIG. 1 and FIG. 2, when an operator does not perform an operation, the coupling mechanism 260 is in a state where the tubular member 262 is abutted on the restricting member 264 by a biasing force of the spring 263. In this case, the plurality of lock balls 261 project on the inner peripheral side of the first body portion 217 from through holes formed in the outer peripheral surface of the first body portion 217.

As shown in FIG. 2, in a state where the plug device 100 is inserted into the socket device 200, the lock balls 261 of the socket device 200 are engaged with the engaging groove 121a of the plug device 100. In a state shown in FIG. 2, the lock balls 261 are maintained in a state of being engaged with the engaging groove 121a unless an operator moves the tubular member 262 along the axis X2. Accordingly, the coupling device 300 is brought into a coupled state where the plug device 100 and the socket device 200 are coupled to each other. When the operator pulls the tubular member 262 to the flow port 212 side, the lock balls 261 are brought into a state where the lock balls 261 can be moved from the engaging groove 121a. Accordingly, the coupled state between the plug device 100 and the socket device 200 is released so that a separated state shown in FIG. 1 is brought about.

As shown in FIG. 2, in the coupled state where the plug device 100 is coupled to the socket device 200, the distal end portion 121 of the valve element portion 120 of the plug device 100 is in contact with the distal end portion 221 of the valve element portion 220 of the socket device 200. In this case, a force by which the operator inserts the plug device 100 into the socket device 200 is transmitted to the valve element portion 120 of the plug device 100 through the valve element portion 220 of the socket device 200 so that the distal end portion 121 of the plug device 100 is separated from the valve hole 115. In the same manner, the force by which the operator inserts the plug device 100 into the socket device 200 is transmitted to the valve element portion 220 of the socket device 200 through the valve element portion 120 of the plug device 100 so that the distal end portion 221 of the socket device 200 is separated from the valve hole 215.

When the distal end portion 121 of the plug device 100 is separated from the valve hole 115, a gap is formed between the valve hole 115 and the distal end portion 121. In the same manner, when the distal end portion 221 of the socket device 200 is separated from the valve hole 215, a gap is formed between the valve hole 215 and the distal end portion 221. With the formation of these gaps, a fluid is allowed to flow between the plug device 100 and the socket device 200.

These gaps form reduced diameter portions. Each reduced diameter portion locally reduces a flow passage cross-sectional area of the fluid flow passages 113, 213 which make the flow port 111 and the flow port 212 communicate with each other. The flow holes 124 formed in the distal end portion 121 of the plug device 100 and the flow holes 224 formed in the distal end portion 221 of the socket device 200 also form reduced diameter portions. Each reduced diameter portion locally reduces a flow passage cross-sectional area of the fluid flow passages 113, 213 which make the flow port 111 and the flow port 212 communicate with each other. Accordingly, a flow speed of a fluid which passes through the reduced diameter portions increases and hence, static electricity is generated due to friction between portions of the valve element portions 120, 220 in the vicinity of the reduced diameter portions, the valve holes 115, 215, and the fluid. For this reason, the fluid is charged with static electricity.

In this embodiment, to properly remove static electricity charged on a fluid which passes through the reduced diameter portions, a portion of the plug device 100 and a portion of the socket device 200 are respectively made of a conductive fluororesin having conductivity. Hereinafter, materials for forming respective parts of the plug device 100 and the socket device 200 are described.

As described above, the fluid flow passages 113, 213 are respectively formed in the body portions 110, 210, and the valve element portions 120, 220 are respectively disposed in the body portions 110, 210. A fluid, which passes through the reduced diameter portion thus being charged with static electricity, flows into the inner space S1 of the proximal end portion 122 of the valve element portion 120. In the same manner, a fluid, which passes through the reduced diameter portion thus being charged with static electricity, flows into the inner space S2 of the proximal end portion 222 of the valve element portion 220.

In view of the above, in the plug device 100 in this embodiment, the proximal end portion 122 of the valve element portion 120 and the second body portion 118 disposed in a state of being in contact with the proximal end portion 122 are made of a conductive fluororesin material. With such a configuration, the proximal end portion 122 is conductive with the conductive member 140 through the second body portion 118 thus being maintained at a ground potential. Accordingly, static electricity charged on a fluid flowing into the inner space S1 is removed.

In the same manner, in the socket device 200 in this embodiment, the proximal end portion 222 of the valve element portion 220 and the second body portion 218 disposed in a state of being in contact with the proximal end portion 222 are made of a conductive fluororesin material where carbon nanotubes are dispersed thus being imparted with conductivity. With such a configuration, the proximal end portion 222 is conductive with the conductive member 240 through the second body portion 218 thus being maintained at a ground potential. Accordingly, static electricity charged on a fluid flowing into the inner space S2 is removed.

On the other hand, in the coupling device 300 of this embodiment, the distal end portion 121 and the first body portion 117 of the plug device 100, and the distal end portion 221 and the first body portion 217 of the socket device 200 are made of a non-conductive fluororesin material where carbon nanotubes are not dispersed.

In this embodiment, the fluororesin material means PTFE (polytetrafluoroethylene), PCTFE (polychlorotrifluoroethylene), or PFA (tetrafluoroethylene-perfluoroalkylvinylether Copolymer), for example. A fluororesin material in the form of powder (PTFE G163 made by ASAHI GLASS CO., LTD, for example) may be used as a fluororesin material.

The distal end portion 121 of the plug device 100 and the distal end portion 221 of the socket device 200 are members which come into contact with each other when the plug device 100 and the socket device 200 are coupled to each other. Accordingly, the distal end portion 121 of the plug device 100 and the distal end portion 221 of the socket device 200 are desirably made of PCTFE particularly having high mechanical strength.

Hereinafter, a conductive fluororesin material used in this embodiment is described. The conductive fluororesin material used in this embodiment is a material containing a fluororesin material and carbon nanotubes dispersed in the fluororesin material.

It is desirable to use carbon nanotubes having the following characteristics, for example, as carbon nanotubes to be dispersed in a fluororesin material.

Having a fiber length of 50 μm or more and 150 μm or less.

Having a fiber diameter of 5 nm or more and 20 nm or less.

Having a bulk density of 10 mg/cm$^3$ or more and 70 mg/cm$^3$ or less.

Having a G/D ratio of 0.7 or more and 2.0 or less.

Having a purity of 99.5% or more.

Having a plurality of layers (four to twelve layers, for example).

In this embodiment, a fiber length of carbon nanotubes is set to 50 μm or more so as to impart sufficient conductivity to a fluororesin material with a small amount of carbon nanotubes when carbon nanotubes are dispersed in the fluororesin material.

A G/D ratio is a value indicating a ratio of a peak of G-band to a peak of D-band in the Raman spectrum of carbon nanotube. The G-band is derived from the graphite structure. The D-band is derived from defects. The G/D ratio shows a ratio of crystal purity to a defect concentration of carbon nanotubes.

Inventors studied the relationship between an addition amount [weight %] of carbon nanotubes to be dispersed in a fluororesin material and a volume resistivity [Ω·cm] of a conductive fluororesin material containing a fluororesin material and carbon nanotubes dispersed in the fluororesin material. As a result, the inventors obtained the result shown in FIG. 3.

Figure 3:
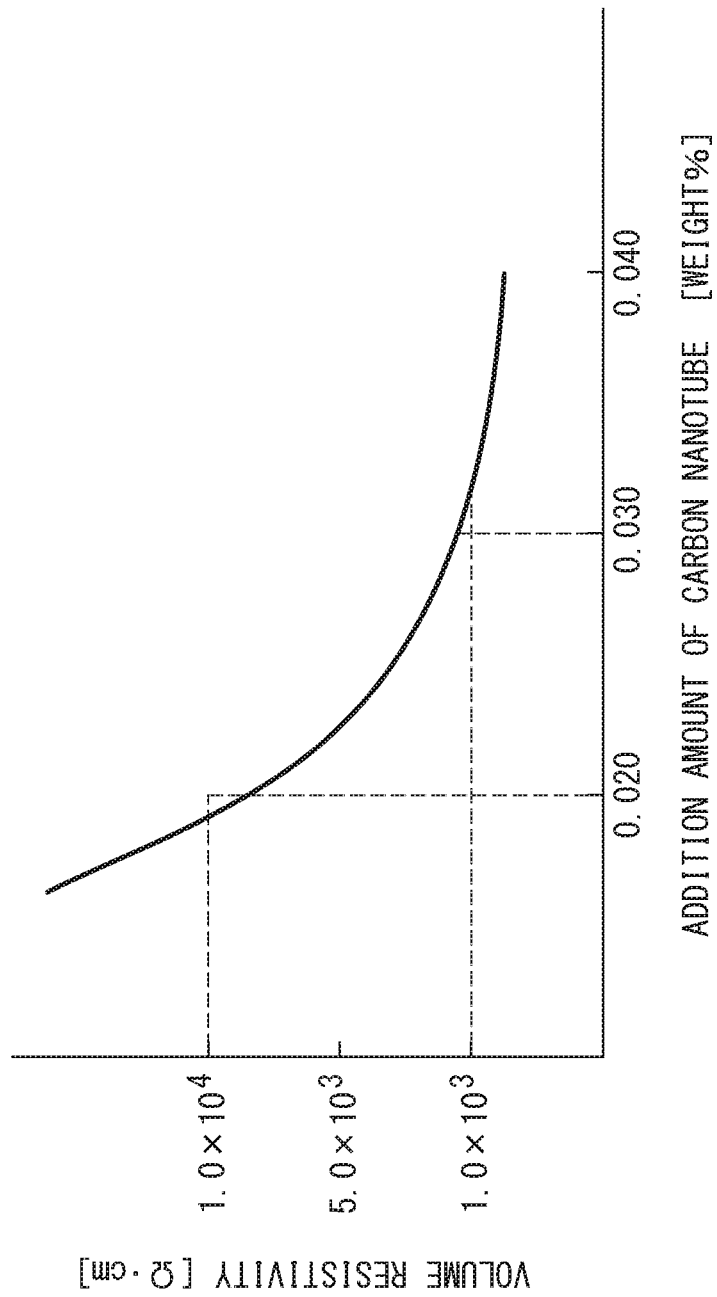
FIG. 3 is a graph showing the relationship between an addition amount of carbon nanotubes and a volume resistivity of a conductive fluororesin material.

The result shown in FIG. 3 is the result obtained by measuring a volume resistivity of test pieces based on "testing method for resistivity of conductive plastics with a four-point probe array" stipulated in JIS K 7194.

A plurality of test pieces were prepared as follows. A material was subjected to melt-kneading by a kneader and, thereafter, test pieces were formed by applying compression molding to the material by a compression molding machine. Then, each test piece was formed into a size described in JIS K 7194.

PTFE G163 made by ASAHI GLASS CO., LTD was used as a fluororesin material for forming the test pieces.

A resistivity meter which uses a four-point probe method described in JIS K 7194 was used for measuring a volume resistivity. The four-point probe method is a method where four pointed probes (electrodes) are brought into contact with a test piece, and a resistance of the test piece is obtained from an electric current made to flow between two probes disposed on the outer side and a potential difference generated between two probes disposed on the inner side.

A volume resistivity was calculated by averaging measurement values obtained at a plurality of positions of the plurality of respective test pieces.

According to the result shown in FIG. 3, when an addition amount of carbon nanotubes falls within a range of 0.020 weight % or more and 0.030 weight % or less, a volume resistivity of a conductive fluororesin material falls within a range of larger than $1.0 \times 10^3$ Ω·cm and less than $1.0 \times 10^4$ Ω·cm. Such values of the volume resistivity are sufficiently low compared to a value of a volume resistivity ($10^{18}$ Ω·cm) of a fluororesin material where carbon nanotubes are not dispersed.

The inventors prepared a coupling device 300 including valve element portions 120, 220 and second body portions 118, 218 made of a conductive fluororesin material where an addition amount of carbon nanotubes is set to 0.025 weight %. The inventors measured charging voltages generated on the fluid flow passages 113, 213 in a state where air of 50 kPa is made to flow through the fluid flow passages 113, 213 using the coupling device 300. As a result, the measurement result was obtained where a charging voltage generated on the fluid flow passages 113, 213 was maintained at approximately 0.2 kV. In the coupling device 300 of this embodiment, when the conductive members 140, 240 are not connected to the ground cables 150, 250, the measurement result was obtained where a charging voltage generated on the fluid flow passages 113, 213 was maintained at approximately 3.4 kV.

On the other hand, the inventors prepared a coupling device of a comparative example including valve element portions 120, 220 and second body portions 118, 218 made of a fluororesin material to which no carbon nanotubes are added. The inventors measured charging voltages generated on the fluid flow passages 113, 213 in a state where air of 50 kPa is made to flow through the fluid flow passages 113, 213 using the coupling device. As a result, the measurement result was obtained where a charging voltage generated on the fluid flow passages 113, 213 was maintained at approximately 3.0 kV or more.

Further, in the coupling device of the comparative example, when the conductive members 140, 240 are not connected to the ground cables 150, 250, the measurement result was obtained where a charging voltage generated on the fluid flow passages 113, 213 was maintained at approximately 19.9 kV or more.

In view of the above-mentioned result, in this embodiment, a conductive fluororesin material is used for forming the valve element portions 120, 220 and the second body portions 118, 218 of the coupling device 300, and the conductive fluororesin material contains carbon nanotubes at a ratio of 0.020 weight % or more and 0.030 weight % or less. Further, the valve element portions 120, 220 and the second body portions 118, 218 are connected to the ground cables 150, 250 through the conductive members 140, 240. With such a configuration, a charging voltage generated on the fluid flow passages 113, 213 can be maintained at a low value of approximately 0.2 kV.

Figure 4:
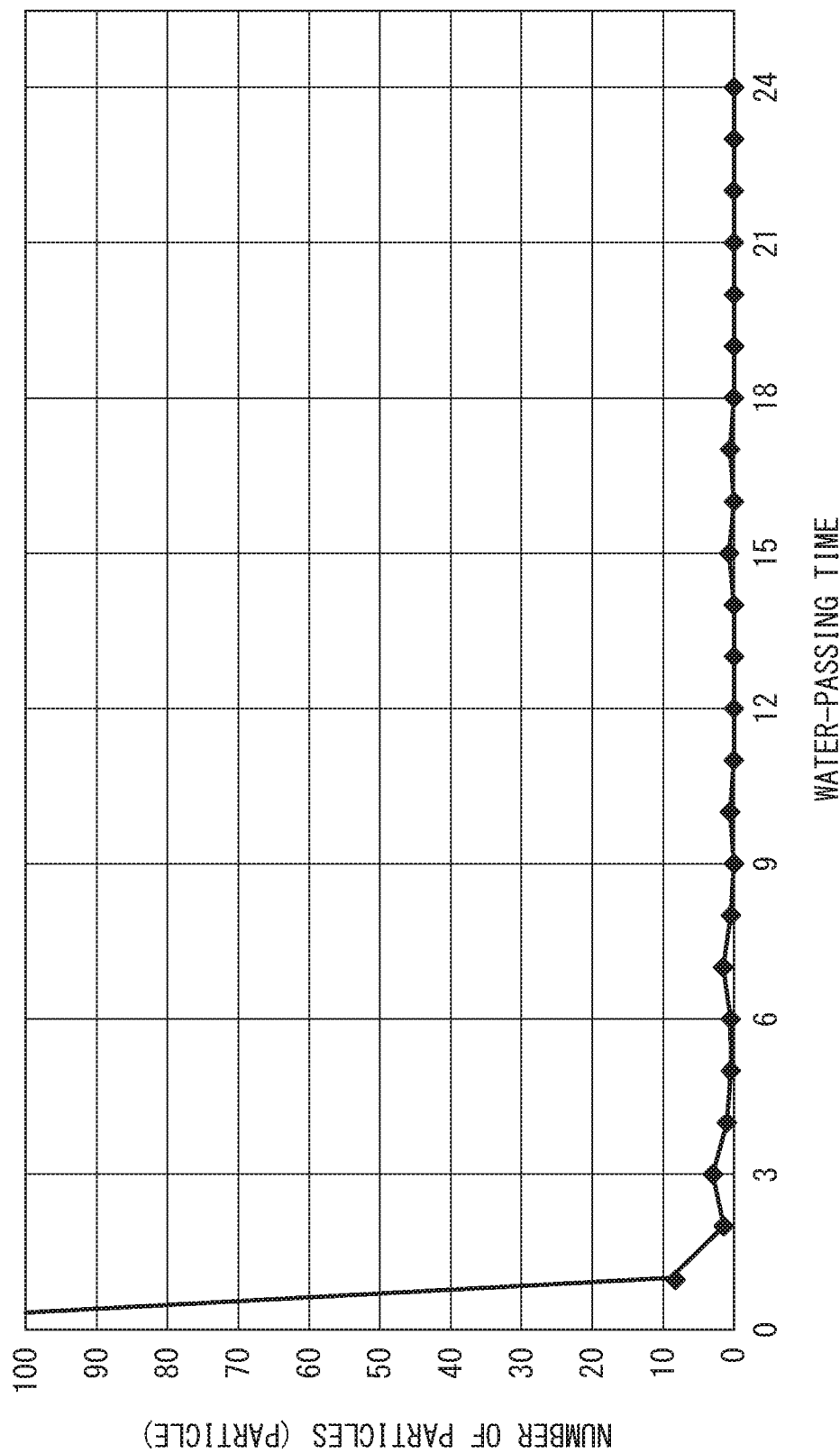
FIG. 4 is a graph showing the relationship between a water flowing time and the number of particles.

The inventors also prepared a coupling device 300 including valve element portions 120, 220 and second body portions 118, 218 made of a conductive fluororesin material where an addition amount of carbon nanotubes is set to 0.025 weight %. The inventors measured the number of fine particles (particles) contained in a fluid flowing through the fluid flow passages 113, 213 using the coupling device 300. FIG. 4 shows the measurement result showing the relationship between a water flowing time during which pure water is made to flow through the fluid flow passages 113, 213 and the number of particles measured by a particle counter (not shown in the drawing).

In this embodiment, the number of particles means the number of particles with a size of 0.04 μm or more which are contained per 1 ml of pure water.

In the measurement shown in FIG. 4, a flow rate of pure water flowing through the fluid flow passages 113, 213 was set to 0.5 liters/min. A temperature of pure water was set to 25° C.

Although not shown in FIG. 4, the number of particles at the time of starting the measurement (a water flowing time being zero) is approximately 340. Thereafter, with a lapse of water flowing time, the number of particles gradually decreases. After the water flowing time exceeds one hour, the number of particles is maintained at ten or less.

As described above, in the valve element portions 120, 220 and the second body portions 118, 218 in this embodiment, a ratio of carbon nanotubes contained in a conductive fluororesin material is extremely small, that is, 0.030 weight % or less. Accordingly, different from other conductive substances in the form of grain such as carbon black or iron powder, it is possible to prevent contamination of a fluid caused by a contact between the fluid flow passages 113, 213 and the fluid.

The description is made with respect to the manner of operation and advantageous effect acquired by the above-described coupling device 300 of this embodiment.

With the coupling device 300 of this embodiment, a fluid flowing into the fluid flow passages 113, 213 increases a flow speed at the gap formed between the valve holes 115, 215 and the valve element portions 120, 220 thus being charged with static electricity generated due to friction with the valve holes 115, 215 and the valve element portions 120, 220. The fluid charged with static electricity flows through the fluid flow passages 113, 213 while being in contact with the valve element portions 120, 220 accommodated in the body portions 110, 210. At least portions of the valve element portions 120, 220 are made of a conductive fluororesin material having a volume resistivity sufficient for allowing static electricity to be conducted and the valve element portions 120, 220 are conductive with the conductive members 140, 240 maintained at a ground potential.

With such a configuration, static electricity charged on a fluid flowing through the fluid flow passages 113, 213 is removed by the conductive members 140, 240 through the proximal end portions 122, 222 of the valve element portions 120, 220 which are made of a conductive fluororesin material.

As described above, with the coupling device 300 of this embodiment, it is possible to provide the coupling device 300 where a problem can be prevented such as breakdown caused by static electricity generated at the gap formed between the valve holes 115, 215 and the valve element portions 120, 220.

In the coupling device 300 of this embodiment, the conductive fluororesin material contains carbon nanotubes at a ratio of 0.020 weight % or more and 0.030 weight % or less.

Even if a ratio of carbon nanotubes is extremely small as described above, carbon nanotubes of 0.020 weight % or more are dispersed in the fluororesin material so that fixed conductivity is imparted to the valve element portions 120, 220 whereby static electricity can be properly removed. Further, a ratio of carbon nanotubes contained in the conductive fluororesin material is extremely small, that is, 0.030 weight % or less. Accordingly, different from other conductive substances in the form of grain such as carbon black or iron powder, it is possible to prevent contamination of a fluid caused by a contact between the valve element portions 120, 220 and the fluid.

With the coupling device 300 of this embodiment, a fluid flowing into the fluid flow passages 113, 213 from the valve holes 115, 215 is charged with static electricity due to friction both when the fluid passes through the gap formed between the valve holes 115, 215 and the valve element portions 120, 220 and when the fluid passes through the flow holes 124, 224. The fluid charged with static electricity is introduced into the inner spaces S1, S2 of the valve element portions 120, 220. Static electricity charged on the fluid flowing through the inner spaces S1, S2 is removed by the conductive members 140, 240 through the valve element portions 120, 220 formed into a tubular shape.

With the coupling device 300 of this embodiment, the distal end portions 121, 221 are inserted into the valve holes 115, 215 by a biasing force of the springs 130, 230, and the distal end portions 121, 221 are made of a non-conductive fluororesin material containing no carbon nanotubes. Accordingly, the distal end portions 121, 221 can ensure sufficient strength and, at the same time, it is possible to prevent carbon nanotubes being mixed into a fluid due to a contact between the distal end portions 121, 221 and the valve seats 116, 216.

With the coupling device 300 of this embodiment, the proximal end portions 122, 222 are made of a conductive fluororesin material. The proximal end portions 122, 222 and the conductive members 140, 240 are made conductive through the second body portions 118, 218 of the body portions 110, 210. Accordingly, it is possible to properly remove static electricity charged on a fluid which comes into contact with the valve element portions 120, 220.

With the coupling device 300 of this embodiment, the first body portions 117, 217 are made of a non-conductive fluororesin material containing no carbon nanotubes. The second body portions 118, 218 made of a conductive fluororesin material are disposed on the inner peripheral side of the first body portions 117, 217. Accordingly, a non-conductive fluororesin material having relatively high strength is disposed on the outer side and hence, it is possible to provide the coupling device 300 having sufficient strength against an impact or the like from the outside. Further, a portion of a casing of the coupling device 300 is made of a non-conductive fluororesin material. With such a configuration, a manufacturing cost of the coupling device 300 can be reduced compared to a case where the entire casing of the coupling device 300 is made of a conductive fluororesin material.

The invention claimed is:

1. A fluid apparatus that is installed in a piping through which a fluid used in a semiconductor manufacturing apparatus is allowed to flow, the fluid apparatus comprising:
   a body portion in which a fluid flow passage is formed, the fluid flow passage extending along an axis, and having a valve hole at one end of the fluid flow passage; and
   a valve element portion accommodated in the body portion in an advancing and retracting manner along the axis,
   wherein at least a portion of the valve element portion is made of a conductive fluororesin material containing a fluororesin material and carbon nanotubes dispersed in the fluororesin material, and is conductive with a grounding portion maintained at a ground potential,
   wherein a volume resistivity of the conductive fluororesin material falls within a range of larger than $1.0 \times 10^3$ Ω·cm and less than $1.0 \times 10^4$ Ω·cm,
   wherein the valve element portion has a tubular shape conforming to an inner peripheral surface of the body portion, the valve element portion comprising:

a distal end portion, inserted into the valve hole, made of a non-conductive fluororesin material containing no carbon nanotubes; and a proximal end portion made of the conductive fluororesin material, the proximal end having:
   an inner space in communication with an other end of the fluid flow passage; and
   a flow hole allowing a fluid to flow between the inner space and the valve hole, wherein the body portion includes:
   a first body portion configured to support an outer peripheral surface of the valve element portion on a distal end side; and
   a second body portion configured to support an outer peripheral surface of the valve element portion on a proximal end side, the second body portion being disposed on an inner peripheral side of the first body portion, wherein the first body portion is made of a non-conductive fluororesin material containing no carbon nanotubes, and wherein the second body portion is made of the conductive fluororesin material, and is in contact with both a portion of the valve element portion, which is made of the conductive fluororesin material, and the grounding portion.

2. The fluid apparatus according to claim 1, wherein the conductive fluororesin material contains carbon nanotubes at a ratio of 0.020 weight % or more and 0.030 weight % or less.

3. The fluid apparatus according to claim 2, further comprising:
   a biasing force generating portion configured to generate a biasing force in a direction that the valve element portion is inserted into the valve hole.

4. The fluid apparatus according to claim 1, further comprising:
   a biasing force generating portion configured to generate a biasing force in a direction that the valve element portion is inserted into the valve hole.

5. The fluid apparatus according to claim 1, wherein the grounding portion is a metal member mounted on an end portion of the proximal end side of the body portion in a state of being in contact with the second body portion and is maintained at a ground potential.

6. The fluid apparatus according to claim 1, wherein the distal end portion of the valve element portion is integrally formed with the proximal end portion of the valve element portion, the distal end portion being made of a non-conductive fluororesin material containing no carbon nanotubes and the proximal end portion being made of the conductive fluororesin material.

* * * * *